(12) United States Patent
Lai et al.

(10) Patent No.: US 11,139,750 B2
(45) Date of Patent: Oct. 5, 2021

(54) ACTIVE BRIDGE RECTIFIER CIRCUIT

(71) Applicant: DELTA ELECTRONICS, INC., Taoyuan (TW)

(72) Inventors: Chien-An Lai, Taoyuan (TW); Chang-Yuan Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/840,790

(22) Filed: Apr. 6, 2020

(65) Prior Publication Data

US 2021/0111639 A1 Apr. 15, 2021

(30) Foreign Application Priority Data

Oct. 14, 2019 (CN) .......................... 201910974136.5

(51) Int. Cl.
*H02M 7/219* (2006.01)
*H02M 1/38* (2007.01)
*H02M 1/42* (2007.01)
*H02H 7/125* (2006.01)

(52) U.S. Cl.
CPC ............. *H02M 7/219* (2013.01); *H02M 1/38* (2013.01); *H02H 7/125* (2013.01); *H02M 1/4225* (2013.01); *H02M 7/2195* (2021.05)

(58) Field of Classification Search
CPC ......... H02M 7/219; H02M 2007/2195; H02M 1/38; H02H 7/125
See application file for complete search history.

(56) References Cited

U.S. PATENT DOCUMENTS

2013/0176758 A1* 7/2013 Tseng .................... H02M 7/219
363/89
2013/0314072 A1* 11/2013 Miyazaki ............... G01R 19/14
324/76.77

\* cited by examiner

*Primary Examiner* — Jue Zhang
(74) *Attorney, Agent, or Firm* — Muncy, Geissler, Olds & Lowe, P.C.

(57) ABSTRACT

An active bridge rectifier circuit includes a rectifier unit and a control unit. The rectifier unit includes a first upper bridge switch, a second upper bridge switch, a first lower bridge switch, and a second lower bridge switch. The control unit includes a first signal comparator and a second signal comparator. The first signal comparator compares a live wire signal provided from a live wire end with a neutral wire signal provided from a neutral wire end to generate a first comparison signal. The second signal comparator compares the live wire signal with the neutral wire signal to generate a second comparison signal. The first comparison signal controls the first upper bridge switch and the first lower bridge switch. The second comparison signal controls the second upper bridge switch and the second lower bridge switch.

10 Claims, 9 Drawing Sheets

ACTIVE BRIDGE RECTIFIER CIRCUIT

BACKGROUND

Technical Field

The present disclosure relates to a bridge rectifier circuit, and more particularly to an active bridge rectifier circuit having active switch components.

Description of Related Art

The statements in this section merely provide background information related to the present disclosure and do not necessarily constitute prior art.

In the AC-to-DC power supply, the bridge rectifier diode is an essential component, and its main function is to convert the AC power into the DC power for back-end converters.

Furthermore, since the bridge rectifier diode is the boundary between the input terminal and the back-end power wire, its safety and stability are important factors.

As the requirement for efficiency becomes higher and higher, the losses of bridge rectifier diodes cannot be ignored anymore. Therefore, the research and development trend is that using semiconductor switches, such as metal-oxide-semiconductor field-effect transistors (MOSFETs) to substitute for rectifier diodes to form the bridge rectifier circuit architecture for improving efficiency.

The existing conventional control methods use voltages to compare with a corresponding reference voltage to form a drive signal. However, in practical applications, the drive signal is caused by noise interference or non-ideal input voltage waveform to make the upper and lower bridge arms be simultaneously turned on, which causes a safety problem due to the short circuit of the input power source.

Furthermore, if the short circuit is prevented from easily simultaneously turning on the upper and lower bridge arms, the reference voltage is generally increased, but the effective duty cycle is reduced, which affects the utilization rate and controllability of the power supply.

SUMMARY

An object of the present disclosure is to provide an active bridge rectifier circuit to solve the problems in the related art.

In order to achieve the object of the present disclosure, the active bridge rectifier circuit includes a rectifier unit and a control unit. The rectifier unit includes a first upper bridge switch, a second upper bridge switch, a first lower bridge switch, and a second lower bridge switch. The first upper bridge switch and the second lower bridge switch are commonly connected, and coupled to a live wire end of an AC power source. The second upper bridge switch and the first lower bridge switch are commonly connected, and coupled to a neutral wire end of the AC power source. The control unit includes a first signal comparator and a second signal comparator. The first signal comparator compares a live wire signal provided from the live wire end with a neutral wire signal provided from the neutral wire end to generate a first comparison signal. The second signal comparator compares the live wire signal with the neutral wire signal to generate a second comparison signal. The first comparison signal controls the first upper bridge switch and the first lower bridge switch, and the second comparison signal controls the second upper bridge switch and the second lower bridge switch.

In one embodiment, the first signal comparator includes a first non-inverting input end and a first inverting input end for respectively receiving the live wire signal and the neutral wire signal, and the second signal comparator includes a second non-inverting input end and a second inverting input end for respectively receiving the neutral wire signal and the live wire signal.

In one embodiment, the active bridge rectifier circuit further includes a reference voltage unit. The reference voltage unit is coupled to the first inverting input end and the second inverting input end, and provides a reference voltage to adjust a dead time of the first upper bridge switch and the second lower bridge switch and adjust a dead time of the second upper bridge switch and the first lower bridge switch.

In one embodiment, the greater the reference voltage is, the greater the dead time of the first upper bridge switch and the second lower bridge switch, and the greater the dead time of the second upper bridge switch and the first lower bridge switch are.

In one embodiment, the active bridge rectifier circuit further includes a protection unit. The protection unit controls the first upper bridge switch, the second upper bridge switch, the first lower bridge switch, and the second lower bridge switch to be turned off when the first comparison signal has the same logic level as the second comparison signal.

In one embodiment, the protection unit includes an AND gate circuit and a control switch. The AND gate circuit performs an AND operation on the first comparison signal and the second comparison signal to generate an operation signal. The control switch is coupled to the AND gate circuit and receives the operation signal, and the operation signal controls the control switch to be turned on and off.

In one embodiment, the active bridge rectifier further includes a drive unit. The drive unit generates a first upper bridge control signal according to the first comparison signal and the live wire signal, generates a first lower bridge control signal according to the first comparison signal, generates a second upper bridge control signal according to the second comparison signal and the neutral wire signal, and generates a second lower bridge control signal according to the second comparison signal. The first upper bridge control signal, the second upper bridge control signal, the first lower bridge control signal, and the second lower bridge control signal are used to control the first upper bridge switch, the second upper bridge switch, the first lower bridge switch, and the second lower bridge switch, respectively.

In one embodiment, the drive unit includes a first optical coupler and a second optical coupler. When the first comparison signal has the high logic level, the first optical coupler is enabled such that the drive unit generates the first upper bridge control signal having the high logic level according to the live wire signal. When the second comparison signal has the high logic level, the second optical coupler is enabled such that the drive unit generates the second upper bridge control signal having the high logic level according to the neutral wire signal.

In one embodiment, when the first comparison signal has the low logic level, the first optical coupler is disabled such that the drive unit generates the first upper bridge control signal having the low logic level, and when the second comparison signal has the low logic level, the second optical coupler is disabled such that the drive unit generates the second upper bridge control signal having the low logic level.

In one embodiment, the active bridge rectifier circuit further includes a protection unit. The protection unit disables the first optical coupler and the second optical coupler when the first comparison signal and the second comparison signal both have the high logic level so that the drive unit generates the first upper bridge control signal having the low logic level and the second upper bridge control signal having the low logic level, and the protection unit controls the first lower bridge control signal and the second lower bridge control signal to have the low logic level.

Accordingly, the active bridge rectifier circuit is provided to increase the reliability, utilization, and controllability of the active bridge rectifier circuit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 1:
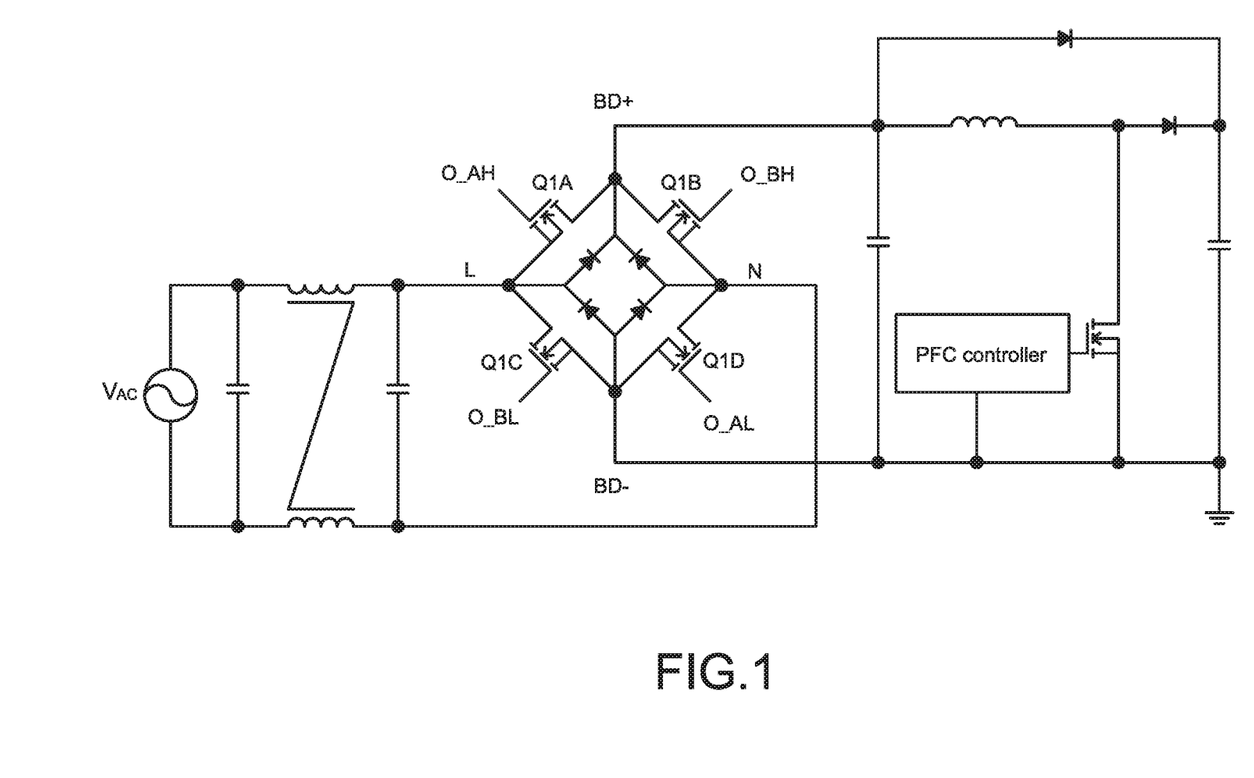
FIG. 1 is a block circuit diagram of an active bridge rectifier circuit applied to a boost PFC according to the present disclosure.

Please refer to FIG. 1, which shows a block circuit diagram of an active bridge rectifier circuit applied to a boost power factor correction (PFC) according to the present disclosure. A front stage of the active bridge rectifier circuit is electrically connected to an EMI filter and further an AC power source $V_{AC}$. A rear stage of the active bridge rectifier circuit is electrically connected to the boost PFC, and the boost PFC is used for operations of power factor correction and voltage boost. However, the present disclosure is not limited thereto, and the front-stage circuit and the rear-stage converter circuit connected to the active bridge rectifier circuit may be selected according to actual requirements.

The active bridge rectifier circuit includes a first upper bridge switch Q1A, a second upper bridge switch Q1B, a first lower bridge switch Q1D, and a second lower bridge switch Q1C in order to form the active bridge rectifier circuit. In one embodiment, the switches may be active switch components, such as MOSFETs, BJTs, IGBTs, or so on. In some embodiment, each of the upper and lower bridge switches Q1A-Q1D is connected in parallel to a diode, that is, the active bridge rectifier circuit is composed of the upper and lower bridge switches Q1A-Q1D connected in parallel to the traditional bridge rectifier circuit composed of diodes. However, the present disclosure is not limited thereto. In other embodiments, the rectifier circuit may be composed of only the active switch components. The first upper bridge switch Q1A is controlled through a first upper bridge control signal O_AH, the second upper bridge switch Q1B is controlled through a second upper bridge control signal O_BH, the first lower bridge switch Q1D is controlled through a first lower bridge control signal O_AL, and the second lower bridge switch Q1C is controlled through a second lower bridge control signal O_BL. In one embodiment, the control signals can be pulse-width modulation (PWM) signals, and the upper and lower bridge switches Q1A-Q1D are correspondingly controlled by the PWM signals.

The first upper bridge switch Q1A is commonly connected to the second lower bridge switch Q1C, and further coupled to a live wire end L of the AC power source $V_{AC}$ through the EMI filter. The second upper bridge switch Q1B is commonly connected to the first lower bridge switch Q1D, and further coupled to a neutral wire end N of the AC power source $V_{AC}$ through the EMI filter. The first upper bridge switch Q1A is commonly connected to the second upper bridge switch Q1B at a positive output end BD+ of the active bridge rectifier circuit. The first lower bridge switch Q1D is commonly connected to the second lower bridge switch Q1C at a negative output end BD− of the active bridge rectifier circuit. The positive output end BD+ and the negative output end BD− are connected to the boost PFC.

Figure 2:
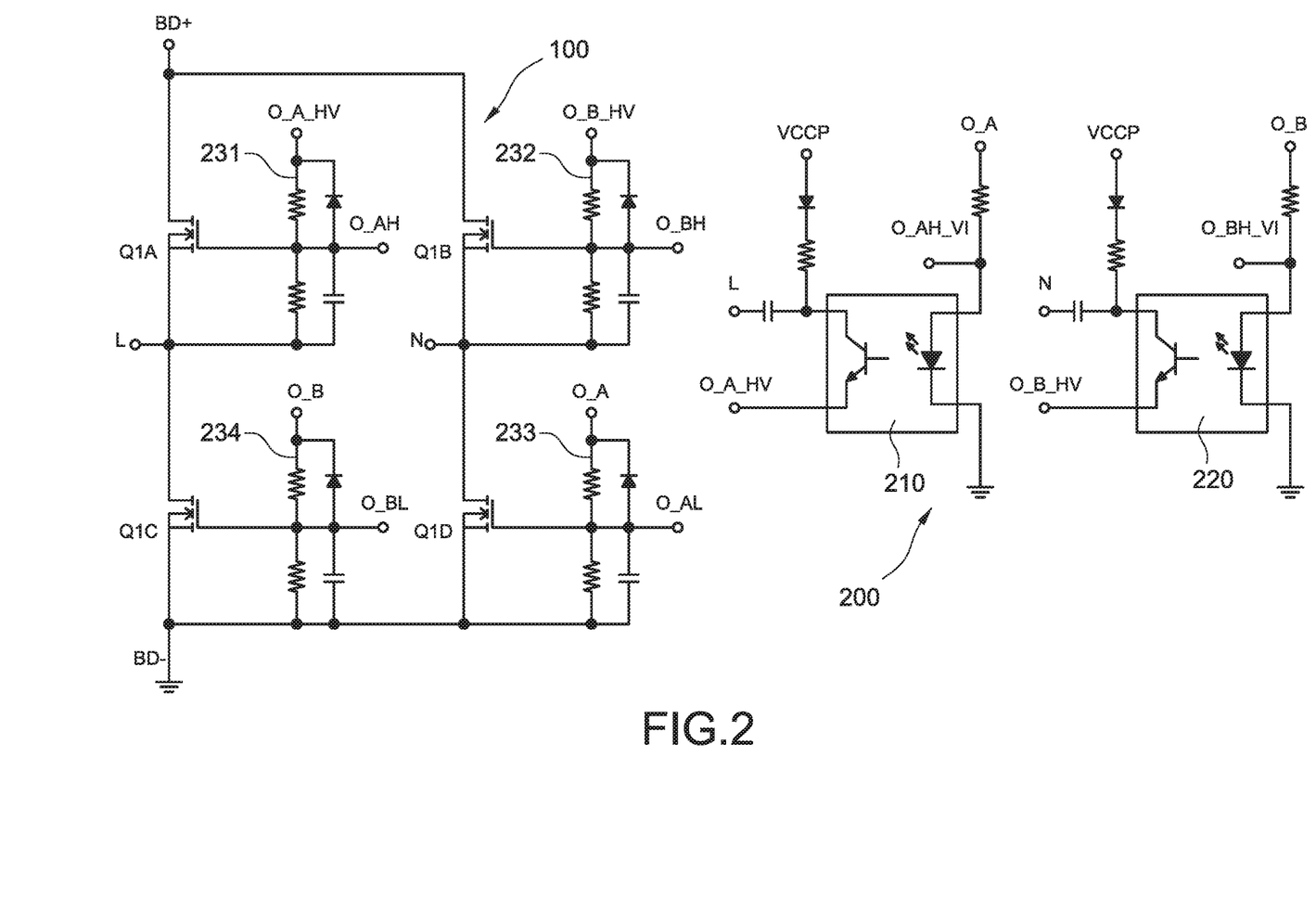
FIG. 2 is circuit diagrams of a rectifier unit and a drive unit of the active bridge rectifier circuit according to the present disclosure.
Figure 3A:
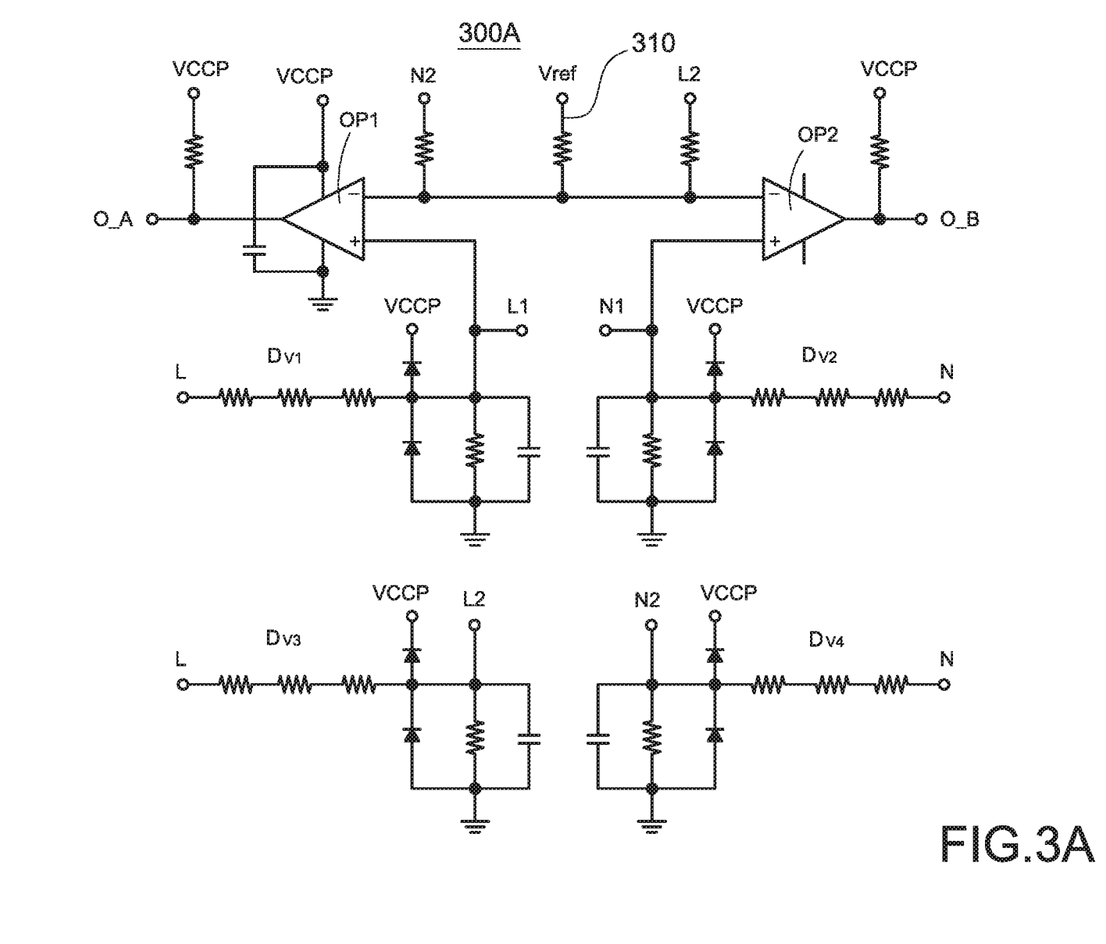
FIG. 3A is a circuit diagram of a control unit of the active bridge rectifier circuit according to a first embodiment of the present disclosure.

Please refer to FIG. 2 and FIG. 3A, which shows circuit diagrams of a rectifier unit and a drive unit of the active bridge rectifier circuit and a circuit diagram of a control unit of the active bridge rectifier circuit according to a first embodiment of the present disclosure, respectively. In order to make the drawing clear and streamlined, the active bridge rectifier circuit is presented in the form of segmentation (left, middle and right), i.e., the same reference signs of output and input contacts in FIG. 2 and in FIG. 3 indicate that the output and input contacts are correspondingly connected. For example, the contact O_A shown in FIG. 2 is connected to the contact O_B shown in FIG. 3A, and the following principles are also used in other drawings.

As shown in FIG. 2, the rectifier unit 100 includes the first upper bridge switch Q1A, the second upper bridge switch Q1B, the second lower bridge switch Q1C, and the first lower bridge switch Q1D respectively corresponding to the first upper bridge switch Q1A, the second upper bridge switch Q1B, the second lower bridge switch Q1C, and the first lower bridge switch Q1D shown in FIG. 1. The labeled L and N are respectively corresponding to the live wire end L and the neutral wire end N of the AC power source $V_{AC}$. Please refer to FIG. 5A, which shows a first waveform between an AC power source and a reference voltage according to the present disclosure. The first upper bridge control signal O_AH for controlling the first upper bridge switch Q1A, the first lower bridge control signal O_AL for controlling the first lower bridge switch Q1D, the second upper bridge control signal O_BH for controlling the second upper bridge switch Q1B, and the second lower bridge control signal O_BL for controlling the second lower bridge switch Q1C can be acquired by the live wire signal and the neutral wire signal coordinated with a reference voltage Vref, and the specific description will be described later.

Please refer to FIG. 3A, which shows a circuit diagram of a control unit of the active bridge rectifier circuit according to a first embodiment of the present disclosure. The control unit 300A includes a first signal comparator OP1, a second signal comparator OP2. In some embodiments, the control unit 300A further includes voltage division circuits. In order to make the voltages of the live wire and the neutral wire of the AC power source $V_{AC}$ can meet the voltage scale required by the control circuit, the live wire voltage and the neutral wire voltage are stepped down by the voltage division circuit to provide the live wire signal and the neutral wire signal suitable for the control circuit, but are not intended to limit the present disclosure. Specifically, the voltage division circuits include a first voltage division circuit Dv1, a second voltage division circuit Dv2, a third voltage division circuit Dv3, and a fourth voltage division circuit Dv4. The first voltage division circuit Dv1 receives the live wire signal provided from the live wire end L to acquire a small-scale first live wire signal L1 by the voltage division. The second voltage division circuit Dv2 receives the neutral wire signal provided from the neutral wire end N to acquire a small-scale first neutral wire signal N1 by the voltage division. The third voltage division circuit Dv3 receives the live wire signal provided from the live wire end L to acquire a small-scale second live wire signal L2 by the voltage division. The fourth voltage division circuit Dv4 receives the neutral wire signal provided from the neutral wire end N to acquire a small-scale second neutral wire signal N2 by the voltage division.

In this embodiment, the first signal comparator OP1 compares the first live wire signal L1 with the second neutral wire signal N2 to generate a first comparison signal O_A, and the first comparison signal O_A is used to control the first upper bridge switch Q1A and the first lower bridge switch Q1D (referred to FIG. 2). Specifically, a non-inverting input end (+) and an inverting input end (−) of the first signal comparator OP1 respectively receive the first live wire signal L1 and the second neutral wire signal N2, and the first signal comparator OP1 compares the first live wire signal L1 with the second neutral wire signal N2 (i.e., L1-N2) to acquire the first comparison signal O_A. The second signal comparator OP2 compares the second live wire signal L2 with the first neutral wire signal N1 to generate a second comparison signal O_B, and the second comparison signal O_B is used to control the second upper bridge switch Q1B and the second lower bridge switch Q1C (referred to FIG. 2). Specifically, a non-inverting input end (+) and an inverting input end (−) of the second signal comparator OP2 respectively receive the first neutral wire signal N1 and the second live wire signal L2, and the second signal comparator OP2 compares the first neutral wire signal N1 with the second live wire signal L2 (i.e., N1-L2) to acquire the second comparison signal O_B.

The first comparison signal O_A and the second comparison signal O_B generated by the control unit 300A are complemented by a high logic level signal and a low logic level signal when the AC power source $V_{AC}$ is normal. When the first upper bridge switch Q1A and the first lower bridge switch Q1D are simultaneously turned on (in the positive half cycle of the AC power source $V_{AC}$), the second upper bridge switch Q1B and the second lower bridge switch Q1C are simultaneously turned off, and vice versa, thereby achieving the effect of rectification and avoiding simultaneously turning on all switches.

Refer to FIG. 2 again, since the upper bridge circuit is not like the lower bridge circuit which has a fixed reference potential (such as ground potential), i.e., the potential of the upper bridge circuit is floating, the design of the drive circuit for the upper bridge circuit is more complicated. In this embodiment, the drive unit 200 includes a first optical coupler 210, a second optical coupler 220, and a plurality of voltage division circuits 231-234. The first optical coupler 210 is electrically connected to an output end of the first signal comparator OP1, the live wire end L, and the first upper bridge switch Q1A, and the second optical coupler 220 is electrically connected to an output end of the second signal comparator OP2, the neutral wire end N, and the second upper bridge switch Q1B. In some embodiments, in the negative half cycle of the AC power source $V_{AC}$, the first signal comparator OP1 generates the first comparison signal O_A having a low logic level and the second signal comparator OP2 generates the second comparison signal O_B having a high logic level, and therefore the second optical coupler 220 is enabled and the first optical coupler 210 is disabled. The enabled second optical coupler 220 generates a signal having a high logic level according to the neutral wire signal of the neutral wire end N, and the second upper bridge control signal O_BH is generated by a voltage division circuit 232 for turning on the second upper bridge switch Q1B. In addition, the second lower bridge control signal O_BL is generated by a voltage division circuit 234 from the second comparison signal O_B having the high logic level for turning on the second lower bridge switch Q1C. The disabled second optical coupler 220 generates a signal having a low logic level, and the first upper bridge control signal O_AH is generated by a voltage division circuit 231 for turning off the first upper bridge switch Q1A. In addition, the first lower bridge control signal O_AL is generated by a voltage division circuit 233 from the first comparison signal O_A having the low logic level for turning off the first lower bridge switch Q1D. When the AC power source $V_{AC}$ is in the positive half cycle, the above-mentioned operations for the switches are just the opposite, and will not be described herein.

The above-mentioned drive unit 200 is exemplified by an optical coupler. However, the present disclosure is not limited thereto, and the drive circuit design of the upper bridge circuit can be realized by using a bootstrap circuit, an isolated integrated circuit, and so on.

Please refer to FIG. 3A again, the control unit 300A further includes a reference voltage unit 310. The reference voltage unit 310 is coupled to the inverting input end of the first signal comparator OP1 and the inverting input end of the second signal comparator OP2 for adjusting the dead time $T_D$ between the first upper bridge switch Q1A and the second lower bridge switch Q1C and the dead time $T_D$ between the second upper bridge switch Q1B and the first lower bridge switch Q1D. According to the magnitude of the reverence voltage Vref, the widths of the upper and lower bridge signals to implement the control manner of the pulse width modulation. Take the reference voltage Vref corresponding to the live wire signal for example, when the reference voltage Vref is larger, the turned-on width of the first upper bridge control signal O_AH and the first lower bridge control signal O_AL is smaller; on the contrary, when the reference voltage Vref is smaller, the turned-on width of the first upper bridge control signal O_AH and the first lower bridge control signal O_AL is larger. In one embodiment, the reference voltage Vref corresponding to the live wire signal is not necessarily the same as the reference voltage Vref corresponding to the neutral wire signal. In the present disclosure, the reference voltage Vref corresponding to the live wire signal may be greater than the reference voltage Vref corresponding to the neutral wire signal, and vice versa.

In other words, the reference voltage Vref can be dynamically adjusted by appropriately designing the reference voltage Vref or by using a software (or firmware) to ensure the dead time of the upper and lower bridge switches is sufficient to avoid easily occurring the short-circuit abnormality, that is, the first upper bridge switch Q1A and the second lower bridge switch Q1C are simultaneously turned on and/or the second upper bridge switch Q1B and the first lower bridge switch Q1D are simultaneously turned on. In some embodiments, the reference voltage unit can acquire the reference voltage Vref by using a voltage division circuit to divide a power voltage VCCP.

Figure 3B:
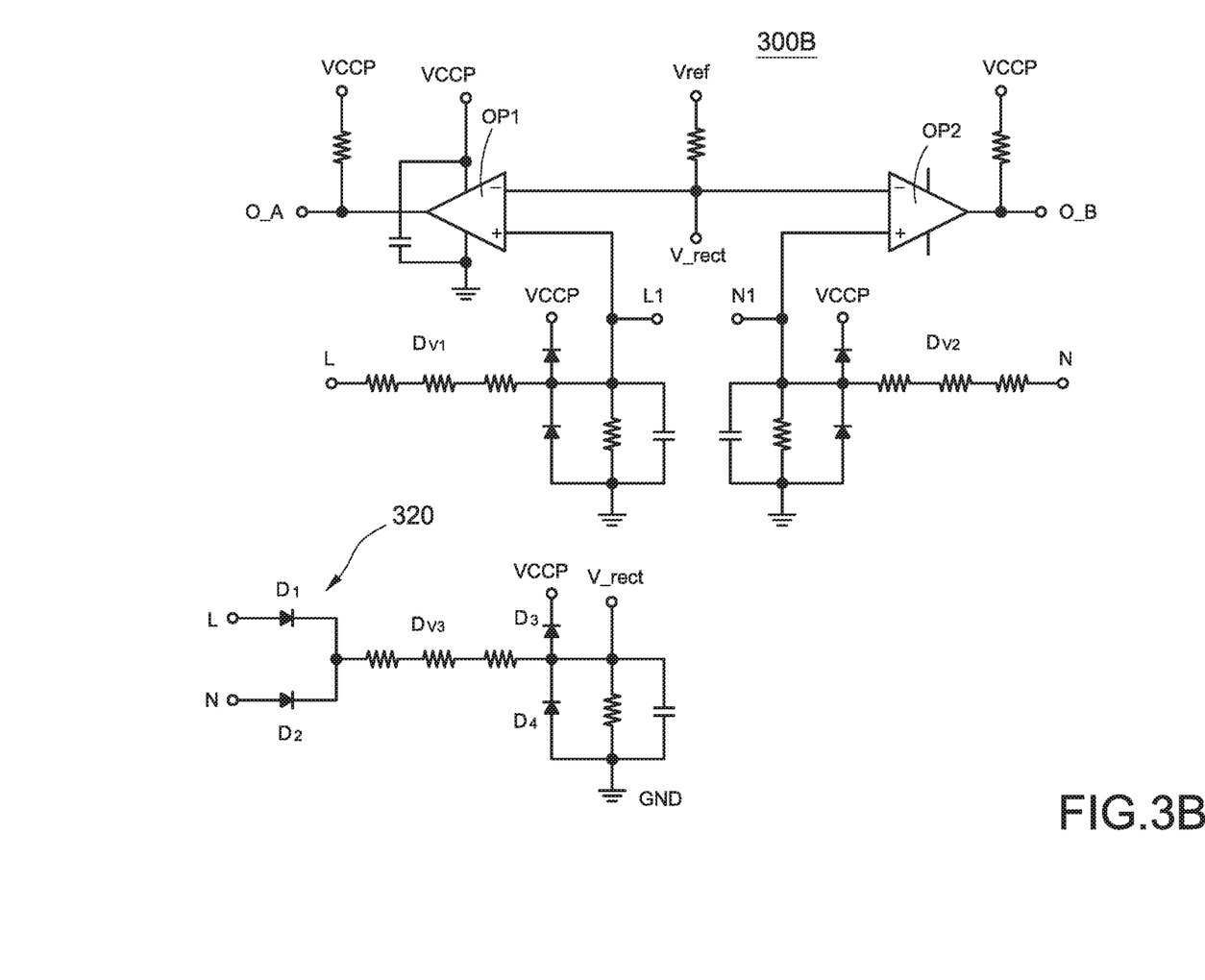
FIG. 3B is a circuit diagram of the control unit of the active bridge rectifier circuit according to a second embodiment of the present disclosure.

Please refer to FIG. 3B, which shows a circuit diagram of the control unit of the active bridge rectifier circuit according to a second embodiment of the present disclosure. In this embodiment, the inverting input end of the first signal comparator OP1 and the inverting input end of the second signal comparator OP2 of the control unit 300B do not directly receive the neutral wire signal and the live wire signal, but are connected to a selection unit 320. The selection unit 320 includes a first input end connected to the live wire end L, a second input end connected to the neutral wire end N, and an output end V_rect. The first input end is coupled to the output end V_rect through a diode D1 and the second input end is coupled to the output end V_rect through a diode D2. The output end V_rect is coupled to the inverting input end of the first signal comparator OP1 and the inverting input end of the second signal comparator OP2, and the output end V_rect is coupled to the power voltage end VCCP through a diode D3 and is coupled to a ground end GND through a diode D4 and a resistor. In the positive half cycle of the AC power source $V_{AC}$, the diode D1 is turned on by the live wire signal having the high logic level, and the voltage at the output end V_rect is adjusted by the third voltage division circuit Dv3 so that the voltage at the output end V_rect is less than the voltage at the non-inverting input end of the first signal comparator OP1 and greater than the voltage at the non-inverting input end of the second signal comparator OP2. Therefore, the first comparison signal O_A generated from the first signal comparator OP1 has the high logic level and the second comparison signal O_B generated from the second signal comparator OP2 has the low logic level. In the negative half cycle of the AC power source $V_{AC}$, the diode D2 is turned on by the neutral wire signal having the high logic level, and the voltage at the output end V_rect is adjusted by the third voltage division circuit Dv3 so that the voltage at the output end V_rect is less than the voltage at the non-inverting input end of the second signal comparator OP2 and greater than the voltage at the non-inverting input end of the first signal comparator OP1. Therefore, the first comparison signal O_A generated from the first signal comparator OP1 has the low logic level and the second comparison signal O_B generated from the second signal comparator OP2 has the high logic level.

Figure 5A:
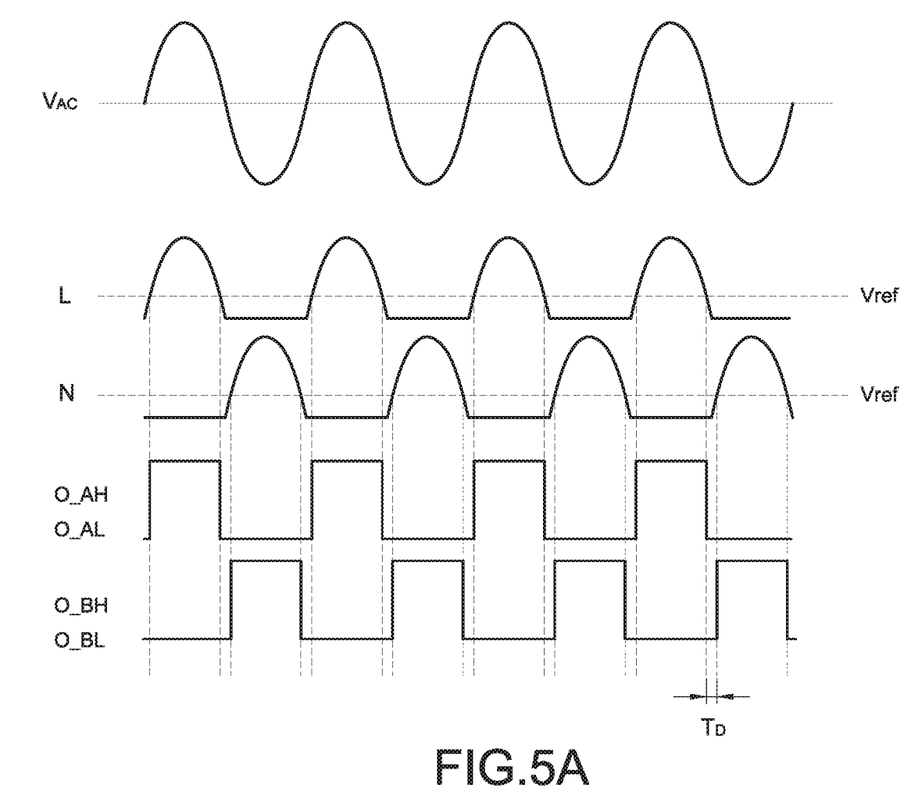
FIG. 5A is a first waveform between an AC power source and a reference voltage according to the present disclosure.
Figure 5B:
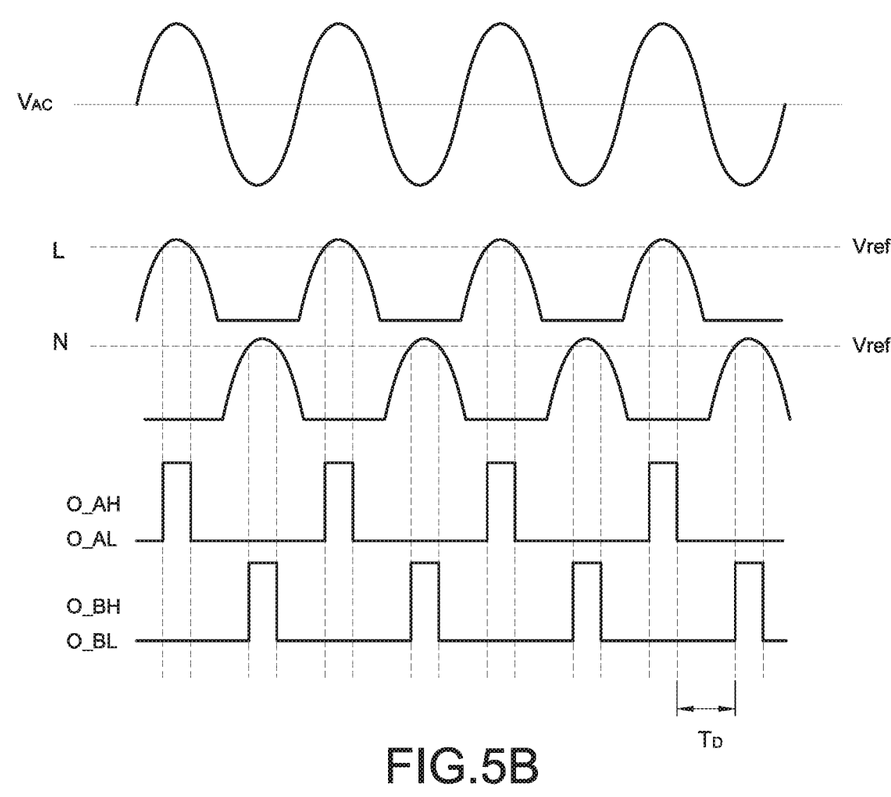
FIG. 5B is a second waveform between the AC power source and the reference voltage according to the present disclosure.
Figure 5C:
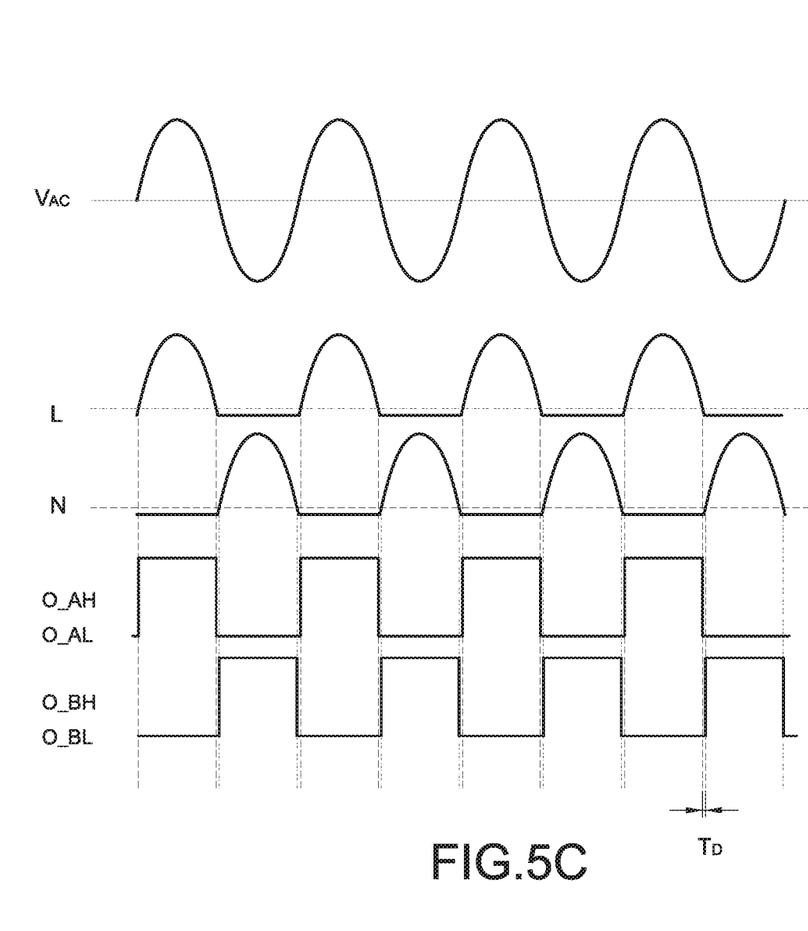
FIG. 5C is a third waveform between the AC power source and the reference voltage according to the present disclosure.

Please refer to FIG. 5A to FIG. 5C, it is assumed that the live wire signal and the neutral wire signal of the AC power source $V_{AC}$ are ideal, for example, the AC power source $V_{AC}$ normally supplies power or supplies power with no load, regardless of the magnitude of the reference voltage Vref (for example, the reference voltage Vref shown in FIG. 5B is greater than that shown in FIG. 5A, and the reference voltage Vref shown in FIG. 5A is greater than that shown in FIG. 5C), there must be a dead time $T_D$ between the first upper bridge control signal O_AH and the second upper bridge control signal O_BH, and there must be a dead time $T_D$ between the first lower bridge control signal O_AL and the second lower bridge control signal O_BL. Also, it is ensured that one of the first comparison signal O_A and the second comparison signal O_B generated by the signal comparison circuit shown in FIG. 3A and FIG. 3B is high level and the other is low level. At this condition, the first upper bridge switch Q1A and the second upper bridge switch Q1B are not simultaneously turned on, and the first lower bridge switch Q1D and the second lower bridge switch Q1C are not simultaneously turned on. Accordingly, it is ensured that no short through occurs between the upper switch and the lower switch (for example, between the first upper bridge switch Q1A and the second lower bridge switch Q1C or between the second upper bridge switch Q1B and the first lower bridge switch Q1D) so that the live wire end L and the neutral wire end N are not short-circuit and the active bridge rectifier circuit maintains to normally operate, i.e., the first upper bridge switch Q1A and the first lower bridge switch Q1D, and the second upper bridge switch Q1B and the second lower bridge switch Q1C can alternately be switched.

Figure 5D:
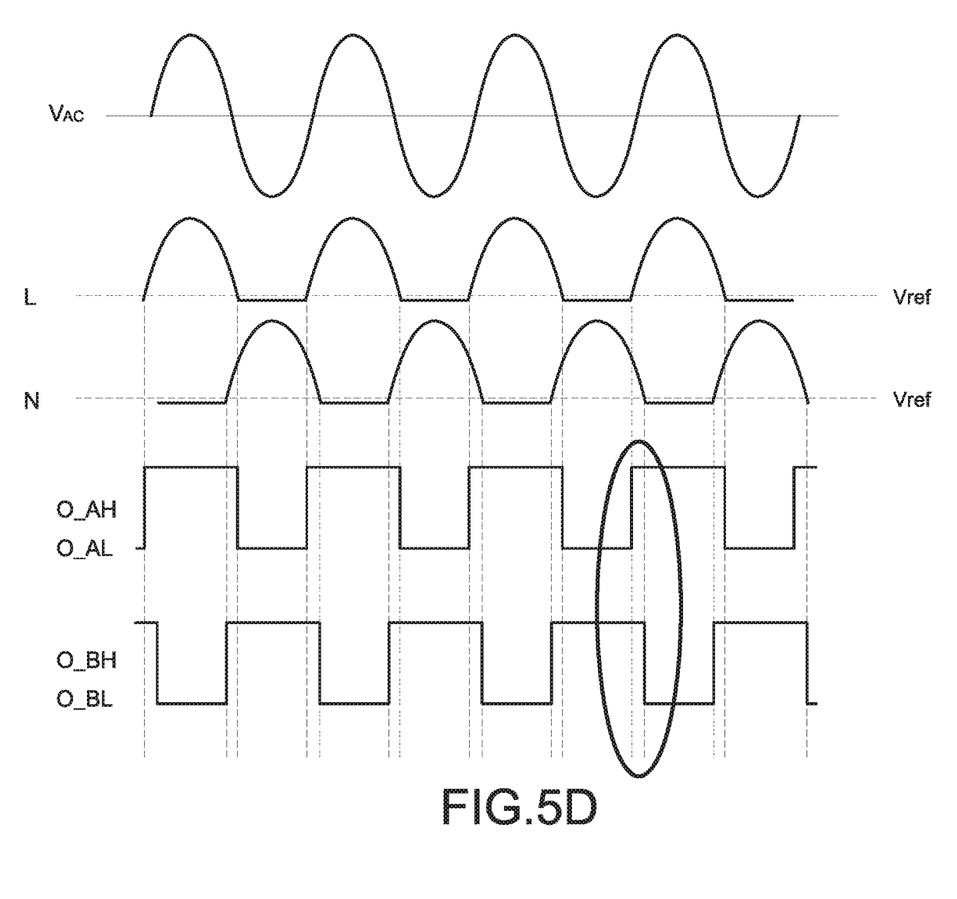
FIG. 5D is a fourth waveform between the AC power source and the reference voltage according to the present disclosure.

Please refer to FIG. 5D, it is assumed that the live wire signal and the neutral wire signal of the AC power source $V_{AC}$ are not ideal, for example, the AC power source $V_{AC}$ abnormally supplies power or supplies power with light load. Therefore, only when the reference voltage Vref is sufficiently large (not shown), that is, a turned-on width of the first upper bridge control signal O_AH (and the first lower bridge control signal O_AL) is sufficiently small, and a turned-on width of the second upper bridge control signal O_BH (and the second lower bridge control signal O_BL) is also sufficiently small, it is to ensure that there is a dead time $T_D$ between the first upper bridge control signal O_AH and the second upper bridge control signal O_BH, or a dead time $T_D$ between the first lower bridge control signal O_AL and the second lower bridge control signal O_BL. Also, it is to ensure one of the first comparison signal O_A and the second comparison signal O_B generated from the signal comparison circuits shown in FIG. 3A and FIG. 3B is high level and the other is low level. However, once the reference voltage Vref is not large enough, a phenomenon as shown in FIG. 5D occurs, that is, a state in which the high level overlap exists between the first upper bridge control signal O_AH and the second upper bridge control signal O_BH (as shown in the indicated circle, and there is no dead time), or a state in which the high level overlap exists between the first lower bridge control signal O_AL and the second lower bridge control signal O_BL (there is no dead time). At this condition, the first comparison signal O_A and the second comparison signal O_B generated by the signal comparison circuits shown in FIG. 3A and FIG. 3B are both high level. Therefore, a short through occurs between the first upper bridge switch Q1A and the second lower bridge switch Q1C or between the second upper bridge switch Q1B and the first lower bridge switch Q1D. Accordingly, the live wire end L is short-circuited with the neutral wire end N, and the active bridge rectifier circuit is damaged and loses its ability to normally operate.

Figure 4:
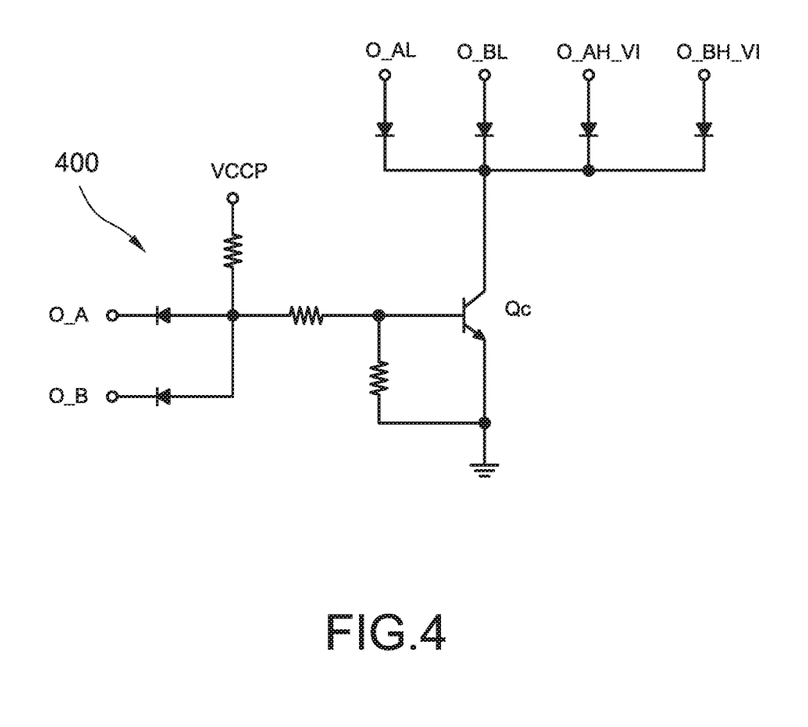
FIG. 4 is a circuit diagram of a protection unit of the active bridge rectifier circuit according to the present disclosure.

Please refer to FIG. 4, which shows a circuit diagram of a protection unit of the active bridge rectifier circuit according to the present disclosure. In order to prevent the first comparison signal O_A and the second comparison signal O_B from being in a high logic level since a short through occurs in the upper and lower bridge switches so that the live wire end L and the neutral wire end N occur a short-circuit condition to cause damage to the active bridge rectifier circuit, a short-circuit protection mechanism is provided in the present disclosure. As shown in FIG. 4, the short-circuit protection mechanism includes a protection unit 400. The protection unit 400 is essentially a logic "AND" operation unit, and the protection unit 400 includes an AND gate circuit and a control switch Qc. The AND gate circuit has two diodes, and two cathodes of the two diodes receive the first comparison signal O_A and the second comparison signal O_B, respectively. When the first comparison signal O_A and the second comparison signal O_B are normal, i.e., one is in the high logic level and the other is in the low logic level, the gate of the control switch Qc coupled to the two diodes is driven by the low-level signal, and therefore the control switch Qc is turned off. At this condition, since the first lower bridge control signal O_AL (same as the first upper bridge control signal O_AH) and the second lower bridge control signal O_BL (same as the second upper bridge control signal O_BH) do not change its control level, the upper and lower bridge switches Q1A-Q1D are normally controlled so that the active bridge rectifier circuit maintains to normally operate.

Once the first comparison signal O_A and the second comparison signal O_B are abnormal, i.e., the two comparison signals O_A,O_B have the high logic level, the two diodes are reverse biased so that a gate drive voltage acquired by dividing the power voltage VCCP is provided to control the control switch Qc to be turned on. Since the control switch Qc is turned on, the first lower bridge control signal O_AL and the second lower bridge control signal O_BL are forcibly grounded to be the low level. As shown in FIG. 2, since the first lower bridge control signal O_AL (same as the first upper bridge control signal O_AH) and the second lower bridge control signal O_BL (same as the second upper bridge control signal O_BH) are both the low level, the low-level first upper bridge control signal O_AH controls the first upper bridge switch Q1A to be turned off, the low-level second upper bridge control signal O_BH controls the second upper bridge switch Q1B to be turned off, the low-level first lower bridge control signal O_AL controls the first lower bridge switch Q1D to be turned off, and the low-level second lower bridge control signal O_BL controls the second lower bridge switch Q1C to be turned off. Therefore, even if the live wire signal and the neutral wire signal of the AC power source $V_{AC}$ are abnormal (resulting that the first comparison signal O_A and the second comparison signal O_B are in the high level), the active bridge rectifier circuit can still be disabled by simultaneously turning off the upper and lower bridge switches Q1A-Q1D, thereby preventing the active bridge rectifier circuit from being damage due to the abnormality of the AC power source $V_{AC}$. Accordingly, the protection unit 400 shown in FIG. 4 can be regarded as the second-stage protection to still protect the active bridge rectifier circuit when the first comparison signal O_A and the second comparison signal O_B are both in the high level.

In conclusion, the present disclosure has following features and advantages:

1. The subtraction between the live wire signal and the neutral wire signal (L-N) and the subtraction between the neutral wire signal and the live wire signal (N-L) can accurately get the commutation point of the power source so that the circuit can correctly work through the correct signals.

2. The second-stage protection can be implemented by simple logic AND operational circuits to increase the reliability of circuit operation.

3. The reference voltage can be dynamically adjusted by appropriately designing the reference voltage or using software (firmware) manner to ensure the dead time of the upper and lower bridge switches is sufficient to avoid easily occurring the short-circuit abnormality.

4. The reference voltage can be effectively and dynamically reduced to maximize the duty cycle, thereby increasing the utilization and controllability of the active bridge rectifier circuit.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An active bridge rectifier circuit, comprising:
 a rectifier unit, comprising:
  a first upper bridge switch, a second upper bridge switch, a first lower bridge switch, and a second lower bridge switch, wherein the first upper bridge switch and the second lower bridge switch are commonly connected and coupled to a live wire end of an AC power source, and the second upper bridge switch and the first lower bridge switch are commonly connected and coupled to a neutral wire end of the AC power source, and
 a control unit, comprising:
  a plurality of voltage division circuits, half of the voltage division circuits directly coupled to the live wire end to generate live wire signals, and the other half of the voltage division circuits directly coupled to the neutral wire end to generate neutral wire signals,
  a first signal comparator, configured to compare the live wire signal with the neutral wire signal to generate a first comparison signal, and
  a second signal comparator, configured to compare the live wire signal with the neutral wire signal to generate a second comparison signal,
 wherein the first comparison signal controls the first upper bridge switch and the first lower bridge switch, and the second comparison signal controls the second upper bridge switch and the second lower bridge switch.

2. The active bridge rectifier circuit in claim 1, wherein the first signal comparator comprises a first non-inverting input end and a first inverting input end for respectively receiving the live wire signal and the neutral wire signal, and the second signal comparator comprises a second non-inverting input end and a second inverting input end for respectively receiving the neutral wire signal and the live wire signal.

3. The active bridge rectifier circuit in claim 2, further comprising:
 a reference voltage unit coupled to the first inverting input end and the second inverting input end, and configured to provide a reference voltage to adjust a dead time of the first upper bridge switch and the second lower bridge switch and adjust a dead time of the second upper bridge switch and the first lower bridge switch.

4. The active bridge rectifier circuit in claim 3, wherein the greater the reference voltage is, the greater the dead time of the first upper bridge switch and the second lower bridge switch and the dead time of the second upper bridge switch and the first lower bridge switch are.

5. The active bridge rectifier circuit in claim 1, further comprising:
a protection unit configured to control the first upper bridge switch, the second upper bridge switch, the first lower bridge switch, and the second lower bridge switch to be turned off when the first comparison signal has the same logic level as the second comparison signal.

6. The active bridge rectifier circuit in claim 5, wherein the protection unit comprises:
an AND gate circuit configured to perform an AND operation on the first comparison signal and the second comparison signal to generate an operation signal, and
a control switch coupled to the AND gate circuit and configured to receive the operation signal, and the operation signal controls the control switch to be turned on and off.

7. The active bridge rectifier circuit in claim 1, further comprising a drive unit configured for generating a first upper bridge control signal according to the first comparison signal and the live wire signal, generating a first lower bridge control signal according to the first comparison signal, generating a second upper bridge control signal according to the second comparison signal and the neutral wire signal, and generating a second lower bridge control signal according to the second comparison signal, wherein the first upper bridge control signal, the second upper bridge control signal, the first lower bridge control signal, and the second lower bridge control signal are used to control the first upper bridge switch, the second upper bridge switch, the first lower bridge switch, and the second lower bridge switch, respectively.

8. The active bridge rectifier circuit in claim 7, wherein the drive unit comprises:
a first optical coupler, wherein when the first comparison signal has the high logic level, the first optical coupler is enabled such that the drive unit generates the first upper bridge control signal having the high logic level according to the live wire signal, and
a second optical coupler, wherein when the second comparison signal has the high logic level, the second optical coupler is enabled such that the drive unit generates the second upper bridge control signal having the high logic level according to the neutral wire signal.

9. The active bridge rectifier circuit in claim 8, wherein when the first comparison signal has the low logic level, the first optical coupler is disabled such that the drive unit generates the first upper bridge control signal having the low logic level, and when the second comparison signal has the low logic level, the second optical coupler is disabled such that the drive unit generates the second upper bridge control signal having the low logic level.

10. The active bridge rectifier circuit in claim 8, further comprising:
a protection unit configured to disable the first optical coupler and the second optical coupler when the first comparison signal and the second comparison signal both have the high logic level so that the drive unit configured to generate the first upper bridge control signal having the low logic level and the second upper bridge control signal having the low logic level, and the protection unit configured to control the first lower bridge control signal and the second lower bridge control signal to have the low logic level.

* * * * *